United States Patent
Shimojima et al.

(10) Patent No.: US 6,922,707 B2
(45) Date of Patent: Jul. 26, 2005

(54) FILE MANAGEMENT METHOD AND CONTENT RECORDING/PLAYBACK APPARATUS

(75) Inventors: Takashi Shimojima, Tokyo (JP); Hiroyuki Suzuki, Kawasaki (JP); Naohiko Noguchi, Yokohama (JP); Mitsuhiro Sato, Atsugi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 335 days.

(21) Appl. No.: 09/988,240

(22) Filed: Nov. 19, 2001

(65) Prior Publication Data

US 2002/0062320 A1 May 23, 2002

(30) Foreign Application Priority Data

Nov. 21, 2000 (JP) ........................................ 2000-354660
Jan. 22, 2001 (JP) ........................................ 2001-013720

(51) Int. Cl.[7] ............................................. G06F 12/00
(52) U.S. Cl. ........................................... 707/200; 707/2
(58) Field of Search .................................. 707/201–203, 707/100, 102, 1, 2, 200; 709/217, 219, 332

(56) References Cited

U.S. PATENT DOCUMENTS

| | | | | |
|---|---|---|---|---|
| 5,706,510 A | * | 1/1998 | Burgoon | 707/203 |
| 5,721,919 A | * | 2/1998 | Morel et al. | 707/203 |
| 5,991,798 A | * | 11/1999 | Ozaki et al. | 709/217 |
| 6,049,799 A | * | 4/2000 | Mangat et al. | 707/10 |
| 6,182,158 B1 | * | 1/2001 | Kougiouris et al. | 719/328 |

(Continued)

FOREIGN PATENT DOCUMENTS

| | | |
|---|---|---|
| CN | 1230063 | 9/1999 |
| CN | 1243291 | 2/2000 |
| EP | 1209586 | 5/2002 |
| JP | 8-161210 | 6/1996 |
| JP | 9-288606 | 11/1997 |
| JP | 11-345164 | 12/1999 |
| JP | 2000-172680 | 6/2000 |
| JP | 2000-207330 | 7/2000 |

OTHER PUBLICATIONS

English Language Abstract of JP 8–161210.
English Language Abstract CN 1230063.
English Language Abstract CN 1243291.
English Language Abstract of JP 11–345164.
English Language Abstract of JP 2000–172680.
English Language Abstract of JP 9–288606.

*Primary Examiner*—Safet Metjahic
*Assistant Examiner*—Brian Goddard
(74) *Attorney, Agent, or Firm*—Greenblum & Bernstein, P.L.C.

(57) ABSTRACT

A package management information recording section 131 creates a directory for each package for content distributed in package units, and creates a package management file indicating the relationship between a directory name and package identifier. A content file recording section 132 creates a content file group management file indicating the relationship between a content file name and a reference name when that content is linked from other content. A link resolution information recording section 133 creates a link resolution file indicating the correspondence between a reference name indicating content included in another package and the package identifier of the other package. A link resolution section 142 of a content playback apparatus 140 specifies a link destination content file using these items of file management information. By this means, a link between contents can be maintained even when distributed content is recorded with a name different from the original content file name.

22 Claims, 15 Drawing Sheets

U.S. PATENT DOCUMENTS

| | | | |
|---|---|---|---|
| 6,192,375 B1 * | 2/2001 | Gross | 707/200 |
| 6,230,212 B1 * | 5/2001 | Morel et al. | 719/316 |
| 6,321,219 B1 * | 11/2001 | Gainer et al. | 707/3 |
| 6,327,703 B1 * | 12/2001 | O'Donnell et al. | 717/162 |
| 6,351,741 B1 * | 2/2002 | Flenniken | 707/2 |
| 6,449,615 B1 * | 9/2002 | Liu et al. | 707/10 |
| 6,449,640 B1 * | 9/2002 | Haverstock et al. | 709/219 |
| 6,487,713 B1 * | 11/2002 | Cohen et al. | 717/105 |
| 6,611,862 B2 * | 8/2003 | Reisman | 709/217 |
| 2003/0028686 A1 * | 2/2003 | Schwabe et al. | 709/332 |
| 2003/0084095 A1 * | 5/2003 | Hayden | 709/203 |

* cited by examiner

PACKAGE MANAGEMENT FILE 301

| PACKAGE DIRECTORY NUMBER | PACKAGE IDENTIFIER |
|---|---|
| 00001 | ARTICLE001114 |

CONTENT FILE GROUP MANAGEMENT FILE 303

| CONTENT NUMBER | REFERENCE NAME |
|---|---|
| 00001 | 001114index.htm |
| 00002 | 001114page2.htm |
| 00003 | image1.jpg |

PACKAGE MANAGEMENT FILE 301

| PACKAGE DIRECTORY NUMBER | PACKAGE IDENTIFIER |
|---|---|
| 00001 | ARTICLE001114 |
| 00002 | ARTICLE001115 |

ADDED PART → 00002

FIG.8

CONTENT FILE GROUP MANAGEMENT FILE 702

| CONTENT NUMBER | REFERENCE NAME |
|---|---|
| 00001 | 001115page.htm |
| 00002 | logo1.jpg |

FIG.9

LINK RESOLUTION FILE 703

| REFERENCE NAME | PACKAGE IDENTIFIER |
|---|---|
| 001114page2.htm | ARTICLE001114 |

FIG.10

PACKAGE MANAGEMENT FILE 1201

| PACKAGE DIRECTORY NAME | PACKAGE IDENTIFIER |
|---|---|
| PKG00001 | ARTICLE001114 |
| PKG00002 | ARTICLE001115 |

FIG.12

CONTENT FILE GROUP MANAGEMENT FILE 1301

| CONTENT FILE NAME | REFERENCE NAME |
|---|---|
| 00001.htm | 001114index.htm |
| 00002.htm | 001114page2.htm |
| 00003.jpg | image1.jpg |

FIG.13

CONTENT FILE GROUP MANAGEMENT FILE 1401

| CONTENT FILE NAME | REFERENCE NAME |
|---|---|
| 00001.htm | 001115index.htm |
| 00002.jpg | logo1.jpg |

FIG.14

PACKAGE IDENTIFIER MANAGEMENT TABLE

| PACKAGE IDENTIFIER | POINTER TO DISTRIBUTION PACKAGE DATA |
|---|---|
| ARTICLE001114 | p1 |
| ARTICLE001115 | p2 |
| ⋮ | ⋮ |

FILE MANAGEMENT METHOD AND CONTENT RECORDING/PLAYBACK APPARATUS

BACKGROUND OF THE INVENTION

1. Field of the Invention

The present invention relates to a file management method for content files stored on a recording medium, a recording/playback apparatus that implements that method, and a recording medium on which a program is recorded in order to load that file management method, and more particularly enables links to be maintained between content files.

2. Description of the Related Art

Demand continues to grow for digital content distribution services that employ communications and broadcasting.

For example, a newspaper article distribution service has been conceived of whereby newspaper articles are downloaded each morning to a mobile phone and recorded onto a recording medium connected to that mobile phone, and an article can be read when wished by connecting that recording medium to another device such as a television set. Also, an electronic book service has been conceived of whereby a novel is divided into chapters, and charging/downloading is performed chapter by chapter.

As a concrete example of a newspaper article distribution service, a method can be considered whereby newspaper articles are written as HTML format files, and one day's worth of HTML files and accompanying image files or audio files are distributed as a single package. With a service that distributes related contents as a single package in this way, the distributed contents are generally recorded on a recording medium with a directory created for each package.

In this case, in the distributed package, an accompanying image file or audio file is linked to an HTML file. Moreover, a case can also be considered where a particular HTML file is linked to other HTML files. Furthermore, although links are generally implemented as closed within a particular package, there are also cases where a link may be provided to an HTML file or image/audio file belonging to another package. A concrete example that can be given is a case where a particular newspaper article is linked to an article distributed the previous day as a related article.

However, in an apparatus that receives content distribution, an original file name may be assigned to a content file in order to enable content recording and playback to be performed efficiently with simple processing, and therefore the directory name and file name in the file system of content recorded in the receiving apparatus may not necessarily match reference names written within other content linked to that content. As a result, there is a problem of cases arising in which a link destination cannot be specified.

Also, even in cases where a link destination can be specified, it may not be possible to maintain the link destination if the directory name or file name in the file system is subsequently changed by the user.

Moreover, even in cases where a link destination can be specified, unlike an interactive service such as Web browsing, in a download service whereby referencing is performed locally on a recording medium, the link destination file may not necessarily be present on the recording medium.

Heretofore, there have been no digital content distribution services that take the above-described link destination specification and maintenance into consideration.

SUMMARY OF THE INVENTION

It is an object of the present invention to provide a file management method that enables inter-content links to be maintained even when distributed content is recorded under a name that is different from the original content file name, and also to provide a content recording/playback apparatus for implementing that method and a recording medium on which content files are recorded in accordance with this file management method.

The present invention achieves the above objects by creating a directory for each package, managing the correspondence between a directory name and package identifier, managing the correspondence between the file name of content recorded in a package and the reference name when that content is linked from elsewhere, and managing the correspondence between the package identifier of another package and a reference name that indicates content included in that other package.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 8 is a drawing showing an example of a package management file in Embodiment 1 of the present invention;

FIG. 9 is a drawing showing an example of a content file group management file in Embodiment 1 of the present invention;

FIG. 10 is a drawing showing an example of a link resolution file in Embodiment 1 of the present invention;

FIG. 12 is a drawing showing an example of a package management file created by a package management information recording section in Embodiment 2 of the present invention;

FIG. 13 is a drawing showing an example of a content file group management file in Embodiment 2 of the present invention;

FIG. 14 is a drawing showing an example of a content file group management file in Embodiment 2 of the present invention;

DETAILED DESCRIPTION OF THE PREFERRED EMBODIMENTS

With reference now to the accompanying drawings, embodiments of the present invention will be explained in detail below. It should be understood that the present invention is in no way limited to these embodiments and may be implemented in a variety of modes within a scope consistent with the principles and novel features disclosed herein.

(Embodiment 1)

Figure 1:
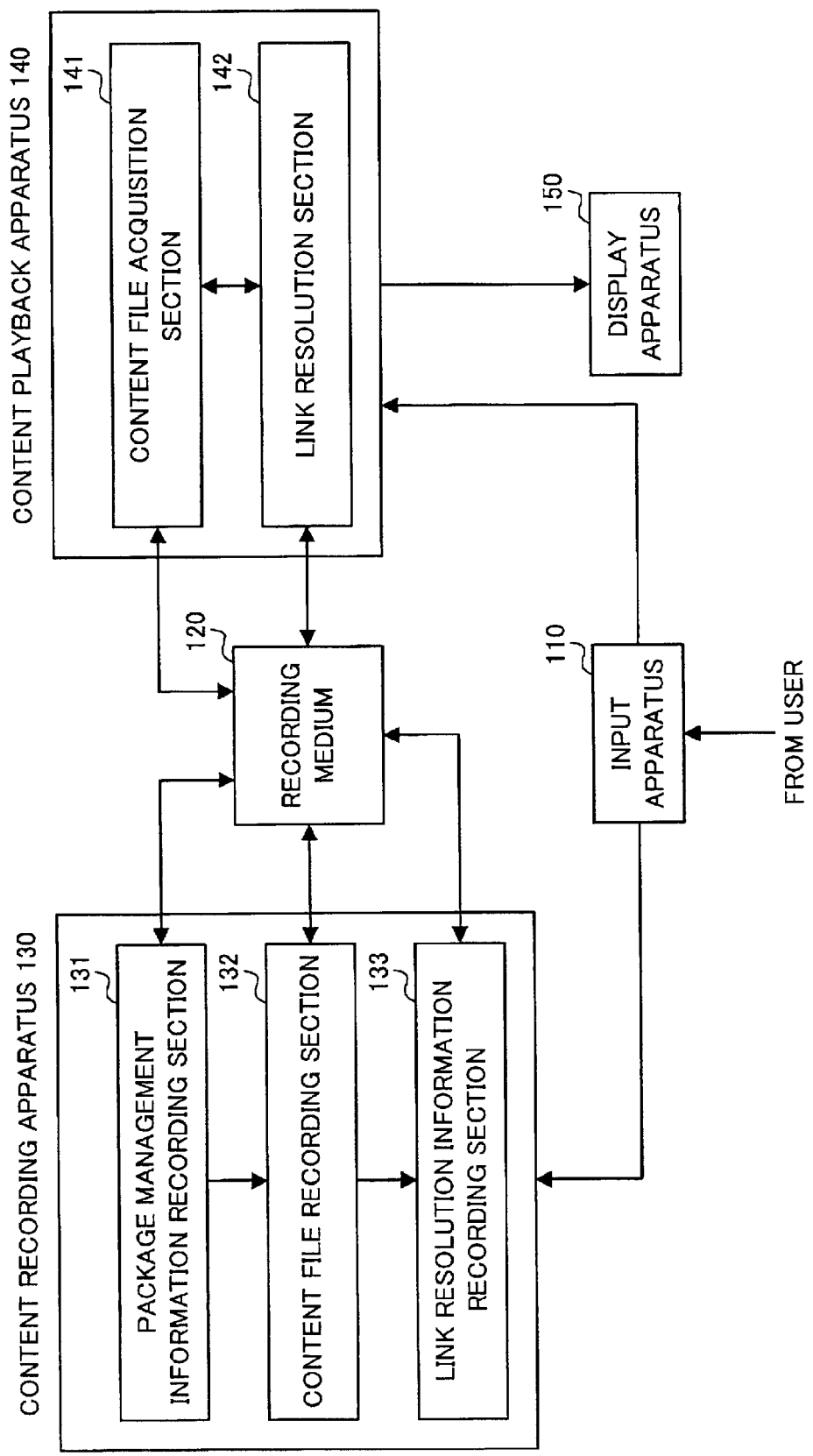
FIG. 1 is a block diagram showing the configuration of a content recording/playback apparatus in Embodiment 1 of the present invention.

FIG. 1 is a block diagram showing the configuration of a content recording/playback apparatus in Embodiment 1 of the present invention. This apparatus chiefly comprises an input apparatus 110, recording medium 120, content recording apparatus 130, content playback apparatus 140, and display apparatus 150. The input apparatus 110 inputs a content recording request from a user to the content recording apparatus 130, and inputs a content playback request from a user to the content playback apparatus 140. The content recording apparatus 130 records package-unit content and file management information on the recording medium 120. The content playback apparatus 140 displays content recorded on the recording medium 120 on the display apparatus 150.

The content recording apparatus 130 comprises a package management information recording section 131, content file recording section 132, and link resolution information recording section 133. The package management information recording section 131 creates package management information for managing packages recorded on the recording medium 120 and records it on the recording medium 120. The content file recording section 132 records each content file of a content file group included in a package on the recording medium 120, and also creates content file group management information for managing these content file groups and records it on the recording medium 120. The link resolution information recording section 133 creates link resolution information for implementing links between content files that straddle packages and records it on the recording medium 120.

The content playback apparatus 140 includes a content file acquisition section 141 and link resolution section 142. The content file acquisition section 141 receives a content playback command from the input apparatus 110, and acquires the specified file from the recording medium 120. When there is a link specification in a content file, the link resolution section 142 performs processing to specify the link destination content file based on link resolution information recorded on the recording medium 120.

Next, content recording processing and content playback processing performed by the content recording/playback apparatus in this embodiment will be described using actual examples.

<Content Recording Processing>

First, a content recording command is received from the user via the input apparatus 110. Here, the case where a recording command for the kind of newspaper article package shown in FIG. 2 is received will be considered.

Figure 2:
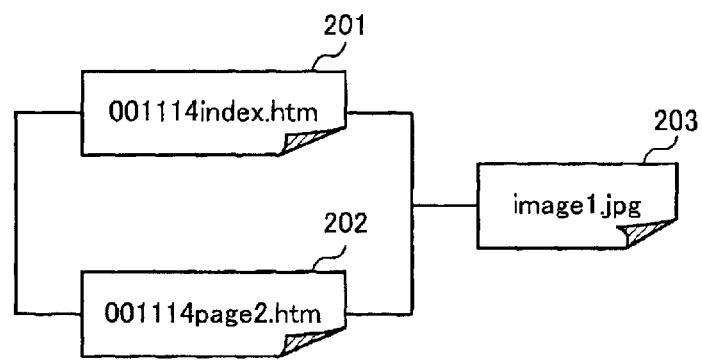
FIG. 2 is a drawing showing an example of a newspaper article package in Embodiment 1 of the present invention.

The newspaper article package in FIG. 2 is a package for November 14, comprising HTML files 201 and 202 and an image file 203. HTML file 201 has the file name "001114index.htm", and has image file 203 with the file name "image1.jpg" embedded in it. HTML file 202 has the file name "001114page2.htm", and, as with HTML file 201, has image file 203 embedded in it. Also, HTML file 201 has a hyperlink to HTML file 202.

Figure 3:
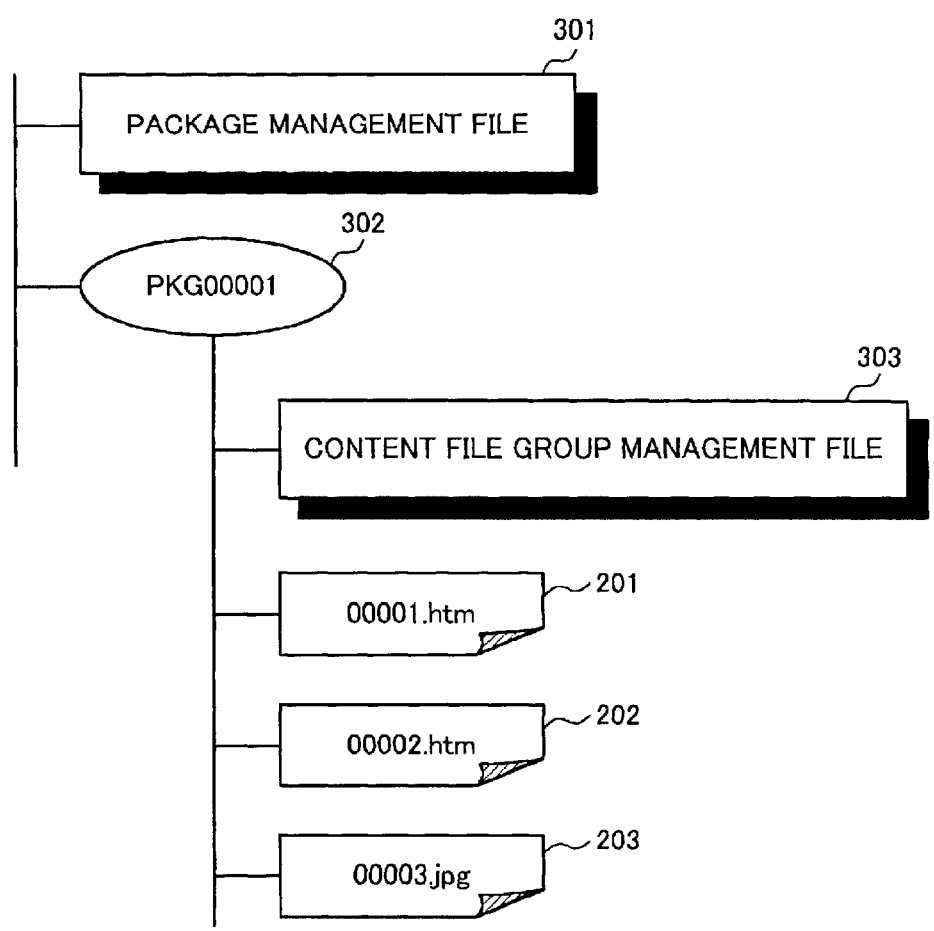
FIG. 3 is a drawing showing an example of directory and file configuration on a recording medium in Embodiment 1 of the present invention.

FIG. 3 is a drawing showing an example of directory and file configuration on the recording medium 120, representing the time when the package shown in FIG. 2 is recorded by the content recording apparatus 130. A directory 302 called "PKG00001" is created at the same level as the package management file 301, and below this directory 302 a content file group management file 303 and files included in the package shown in FIG. 2 are created. HTML files 201 and 202 and image file 203 included in the package shown in FIG. 2 are assumed to be recorded with the file names "00001.htm", "00002.htm", and "00003.jpg", respectively.

When the content recording apparatus 130 receives a content recording command from the input apparatus 110, it first creates or updates the package management file 301 by means of the package management information recording section 131.

Figures 4, 5, 6:
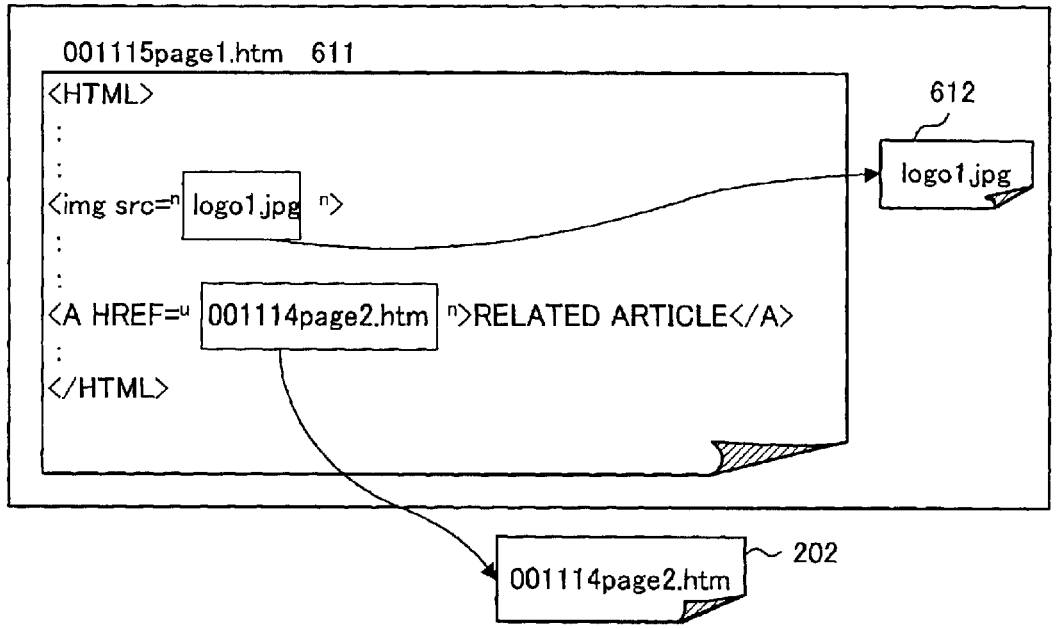
FIG. 4 is a drawing showing an example of a package management file in Embodiment 1 of the present invention.
FIG. 5 is a drawing showing an example of a content file group management file in Embodiment 1 of the present invention.
FIG. 6 is a drawing showing an example of a newspaper article package in Embodiment 1 of the present invention.

FIG. 4 is a drawing showing an example of a package management file 301, representing the stage at which the package shown in FIG. 2 is recorded on the recording medium 120. The package management file 301 manages the correspondence between a package directory number corresponding to the package directory name and a package identifier for uniquely identifying that directory.

In this embodiment, the description is based on a naming rule whereby the directory name of a package directory corresponding to a package directory number is designated "PKGxxxxx (xxxxx=package directory number)", as shown in FIG. 3.

It should be understood that any naming rule may be used as long as it derives the directory name of a package directory uniquely from the package directory number.

Also, in FIG. 4, the string "ARTICLE001114" is used as a package identifier, but as long as this package identifier can uniquely identify a package directory existing on the recording medium 120, any kind of string, numerals, or symbols may be used.

Next, content file recording and content file group management file creation are performed by the content file recording section 132.

FIG. 5 is a drawing showing an example of a content file group management file 303, representing the stage at which the package shown in FIG. 2 is recorded on the recording medium 120. A content file group management file manages the correspondence between a content number corresponding to the file name when recorded on the recording medium 120 and a reference name when that content is linked from other content, and one content file group management file is created for each package directory. The aforementioned content number is used to number an individual package.

In this embodiment, the description is based on a naming rule whereby the content file name corresponding to a content number is designated "xxxxx.EXT (xxxxx=content number, EXT=original file name extension)", as shown in FIG. 3.

It should be understood that any naming rule may be used as long as it derives the content file name on the recording medium 120 uniquely from the content number.

As the package shown in FIG. 2 has no link to content included in another package, the link resolution information recording section 133 does not perform any processing in this case.

Furthermore, a case will be considered in which a recording command for the newspaper article package 610 shown in FIG. 6 is newly generated when the recording medium 120 is in the state shown in FIG. 3.

FIG. 6 is a drawing showing an example of a newspaper article package for November 15 comprising an HTML file 611 and image file 612. HTML file 611 has the file name "001115page1.htm", and has image file 612 with the file name "logo1.jpg" embedded in it. Also, HTML file 611 has a hyperlink to HTML file 202 with reference name "001114index.htm" included in the newspaper article package for November 14 shown in FIG. 2.

Figure 7:
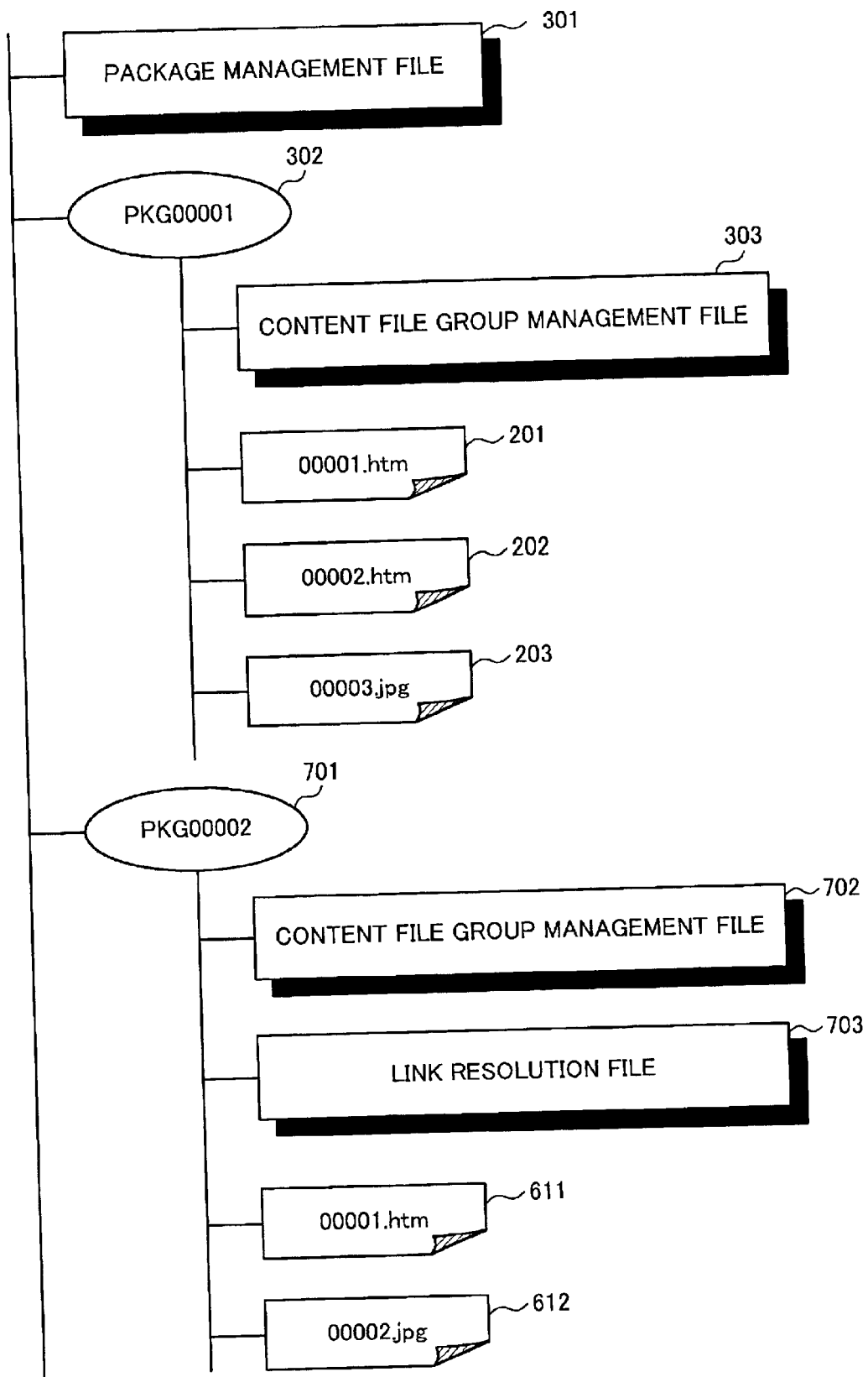
FIG. 7 is a drawing showing an example of directory and file configuration on a recording medium in Embodiment 1 of the present invention.

FIG. 7 is a drawing showing an example of directory and file configuration on the recording medium 120, representing the time when newspaper article package 610 in FIG. 6 is added by the content recording apparatus 130. A directory 701 called "PKG00002" is created at the same level as the package management file 301, and below this directory 701 a content file group management file 702 and files included in the package shown in FIG. 6 are created. HTML files 611 and 612 included in the package shown in FIG. 6 are assumed to be recorded with the file names "00001.htm" and "00002.jpg", respectively.

FIG. 8 is a drawing showing an example of a package management file 301, representing the stage at which newspaper article package 610 shown in FIG. 6 is newly added to the recording medium 120. Compared with FIG. 4, information concerning the newspaper article package of November 15 has been newly added.

FIG. 9 is a drawing showing an example of a content file group management file 702, representing the stage at which newspaper article package 610 shown in FIG. 6 is newly added to the recording medium 120. The configuration of the content file group management file is similar to that in FIG. 5, and so its description will be omitted here.

As shown in FIG. 6, HTML file 611 of the November 15 package has a link to content included in another package, and therefore the link resolution file 703 shown in FIG. 7 is created by the link resolution information recording section 133.

FIG. 10 is a drawing showing an example of a link resolution file 703. A link resolution file manages the correspondence between a reference name indicating a link to content included in another package and the package identifier of the package in which that link destination content exists, and one link resolution file is created for each package directory in which content including a link that straddles packages exists.

<Content Playback Processing>

The case where a playback request for HTML file 201 shown in FIG. 7 is issued via the input apparatus 110 will be considered.

First, the content file acquisition section 141 acquires HTML file 201 from the recording medium 120.

As image file "image1.jpg" is embedded in HTML file 201, the link resolution section 142 resolves the reference of this image.

Figure 11:
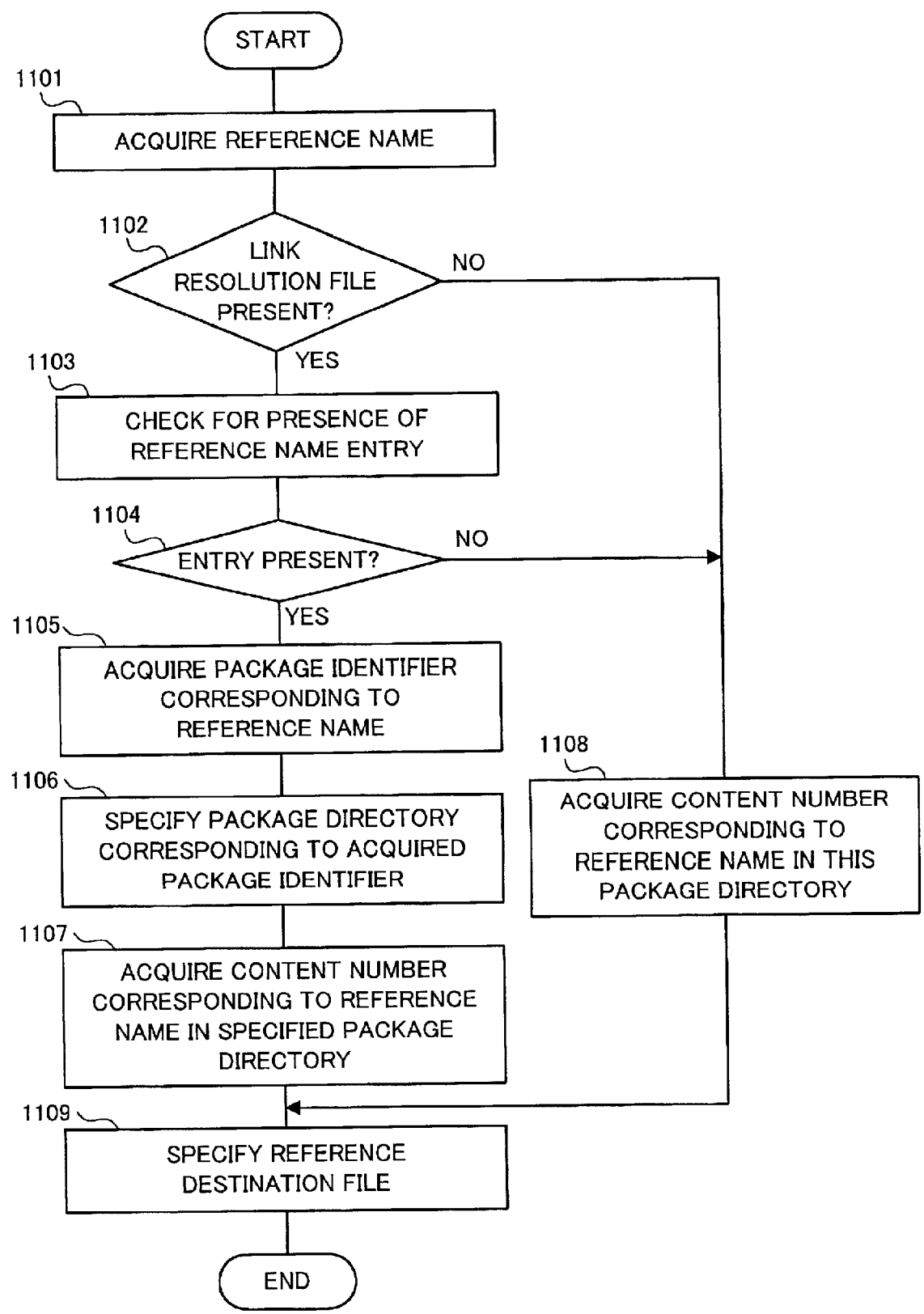
FIG. 11 is a drawing showing the processing flow of a link resolution section in Embodiment 1 of the present invention.

FIG. 11 is a drawing showing the processing flow in the link resolution section 142. The reference resolution processing for image file "image1.jpg" will be described below with reference to FIG. 11.

Step 1101: First, reference name "image1.jpg" is acquired from HTML file 201.

Step 1102: A check is carried out as to whether or not a link resolution file exists in the package directory to which the link source HTML file belongs. In this example, there is no link resolution file in the package directory 302 to which HTML file 201 belongs, so the processing flow proceeds to Step 1108.

Step 1108: The content file group management file of the package directory to which the HTML file belongs is looked at, the reference name acquired in Step 1101 is searched for, and the content number corresponding to this reference name is acquired. In this example, according to FIG. 5, "00003" is acquired as the content number corresponding to reference name "image1.jpg".

Step 1109: The content file corresponding to the content number acquired in Step 1108 is specified as the reference destination file. In this example, as can be seen from FIG. 7, the "00003.jpg" image file 203 is specified, and the image reference is resolved.

The link resolution section 142 makes a content file acquisition request to the content file acquisition section 141 using the reference destination file name specified in this way, and when the content file acquisition section 141 acquires reference destination file "00003.jpg" from the recording medium 120, this image is embedded in HTML file 201 and output to the display apparatus 150.

This concludes the HTML file 201 playback processing.

Next, link resolution processing will be described for the case where the user follows a link to content included in another package from HTML file 611 currently being displayed.

Step 1101: First, reference name "001114page2.htm" is acquired from HTML file 611.

Step 1102: A check is carried out as to whether or not a link resolution file exists in package directory 701 to which link source HTML file 611 belongs. In this case, as can be seen from FIG. 7, link resolution file 703 exists in package directory 701, so the processing flow proceeds to Step 1103.

Step 1103: Link resolution file 703 is looked at, and a check is carried out as to whether or not there is an entry for the reference name acquired in Step 1101. As can be seen from FIG. 10, a reference name "001114page2.htm" entry exists in link resolution file 703, so the processing flow proceeds to Step 1105 via Step 1104. If there were no entry in link resolution file 703, the processing flow would proceed to Step 1108 via Step 1104.

Step 1105: Package identifier "ARTICLE001114" corresponding to reference name "001114page2.htm" is acquired, and the processing flow proceeds to Step 1106.

Step 1106: Package number "00001" corresponding to the above-mentioned acquired package identifier "ARTICLE001114" is ascertained from package management file 301, and it is determined that the package in which the reference destination file exists is package directory 302 (PKG00001).

Step 1107: Next, content file group management file 301 of package directory 302 is looked at, the reference name acquired in Step 1101 is searched for, and the content number corresponding to this reference name is acquired. In this example, according to FIG. 5, "00002" is acquired as the content number corresponding to reference name "001114page2.htm".

Step 1109: Content file "00002.htm" 202 corresponding to the content number acquired in Step 1107 is specified, and links to contents included in other packages are resolved.

As described above, with this embodiment, a package management file that manages the correspondence between a package directory number corresponding to a package directory name and a package identifier for uniquely identifying that directory, and a content file group management file that manages the correspondence between a content number uniquely corresponding to a file name when recorded on the recording medium 120 and a reference name when linked from other content, are created. Then, by using these management files, it is possible to specify a link destination even if the directory name or file name when content is recorded on the recording medium 120 is different from the reference name written in other content linked to that content.

Moreover, a link resolution file that manages the correspondence between a reference name indicating a link to content included in another package and the package identifier of the package in which that link destination content exists is created for each package directory in which content including a link that straddles packages exists. By using these link resolution files, it is possible to follow links to contents belonging to other packages.

Also, according to this embodiment, the file name of a file recorded on the recording medium can be set arbitrarily, providing an effective resolution means when there is a limit to the number of characters in a file name.

Furthermore, in this embodiment, the configuration of a link resolution file has been described as being a simple correspondence table of reference names and package identifiers, but in order to search for a reference name at high speed when performing link resolution, means such as a hash method or B-tree may be used.

Also, in this embodiment, HTML files and image files have been given as examples of content files, but a content file may also be a file of any other format.

(Embodiment 2)

In Embodiment 2, a file management method is described that enables a link destination to be maintained even if a directory name or file name is changed by the user.

The configuration of the content recording/playback apparatus in this embodiment is identical to that shown in FIG. 1. However, in this embodiment, the component elements of a package management file created by the package management information recording section 131 and the component elements of a content file group management file created by the content file recording section 132 differ from those in Embodiment 1.

Next, content recording processing and content playback processing in this embodiment will be described in concrete terms.

The directory and file configurations on the recording medium 120 when the packages shown in FIG. 2 and FIG. 6 are recorded by the content recording apparatus 130 are the same as in FIG. 7. However, the contents of package management file 301 and content file group management files 303 and 702 are different, and therefore the codes package management file 1201 and content file group management file 1301 and 1401 will be used in the following description.

FIG. 12 is a drawing showing an example of a package management file 1201 created by the package management information recording section 131. The difference from FIG. 8 of Embodiment 1 is that this package management file 1201 manages the correspondence between a package directory name recorded on the recording medium 120—not a package directory number—and a package identifier.

FIG. 13 is a drawing showing an example of a content file group management file 1301. The difference from FIG. 5 of Embodiment 1 is that the correspondence managed is between a content file name on the recording medium 120—not a content number—and a reference name.

Similarly, FIG. 14 is a drawing showing an example of a content file group management file 1401 at this time.

In this embodiment, unlike Embodiment 1, no particular naming rule is established for package directory names and content file names on the recording medium 120, and arbitrary names can be assigned.

The operation of the content file acquisition section 141 in content playback processing in this embodiment is similar to that in Embodiment 1.

Processing by the link resolution section 142 in content playback processing in this embodiment is similar to that in Embodiment 1, except for the following three points.

a) In Step 1106, when specifying the package directory, specification is not performed according to a naming rule based on the package number corresponding to the package identifier, but instead the package directory name corresponding to the package identifier is acquired directly.

b) In Step 1107, the content file number is not acquired, but instead the content file name is acquired directly.

c) In Step 1108, the content file number is not acquired, but instead the content file name is acquired directly.

By this means, the same kind of link resolution effect is obtained as in Embodiment 1.

Figure 15:
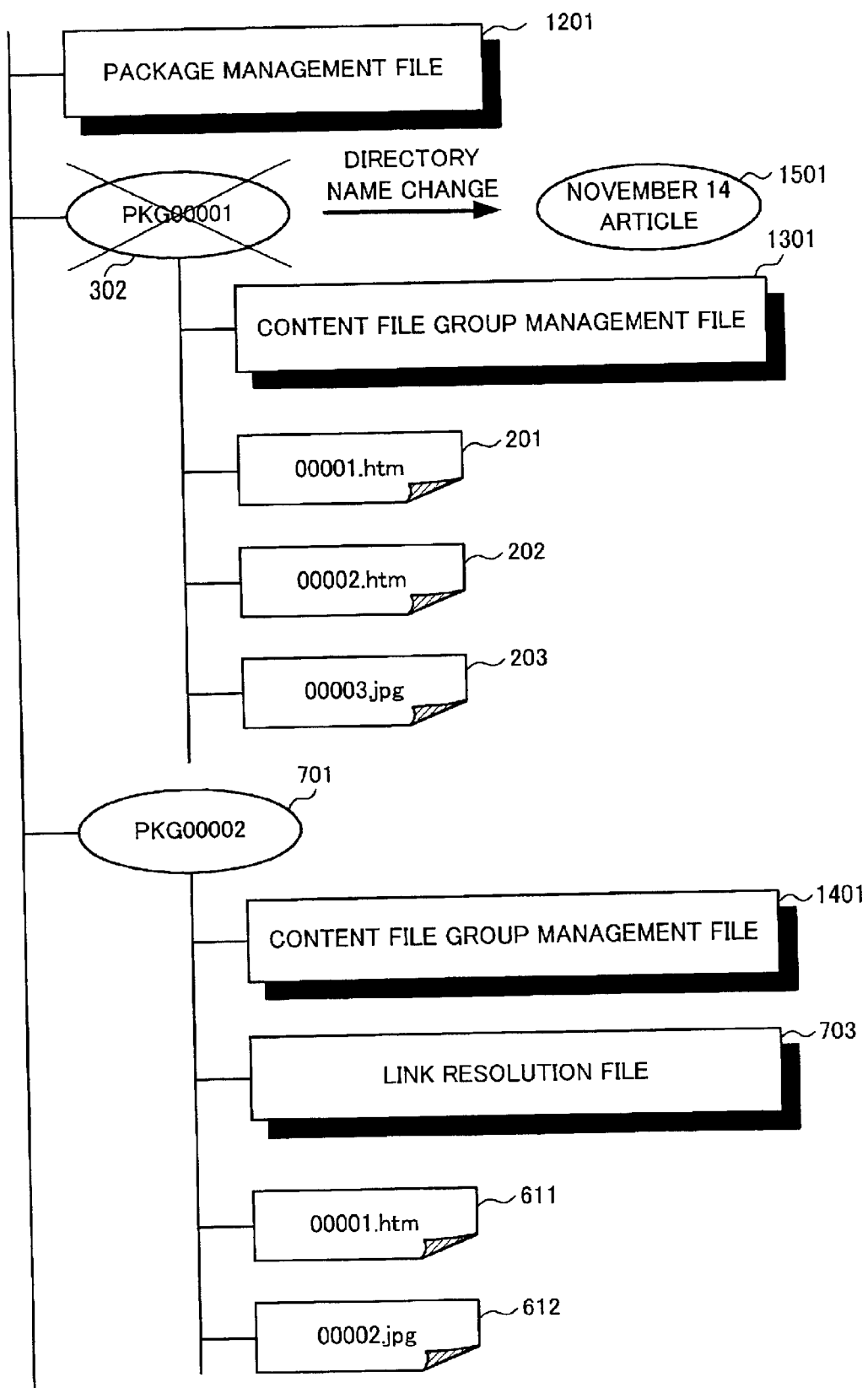
FIG. 15 is a drawing showing a case where a directory and file configuration directory name are changed in Embodiment 2 of the present invention.
Figure 16:
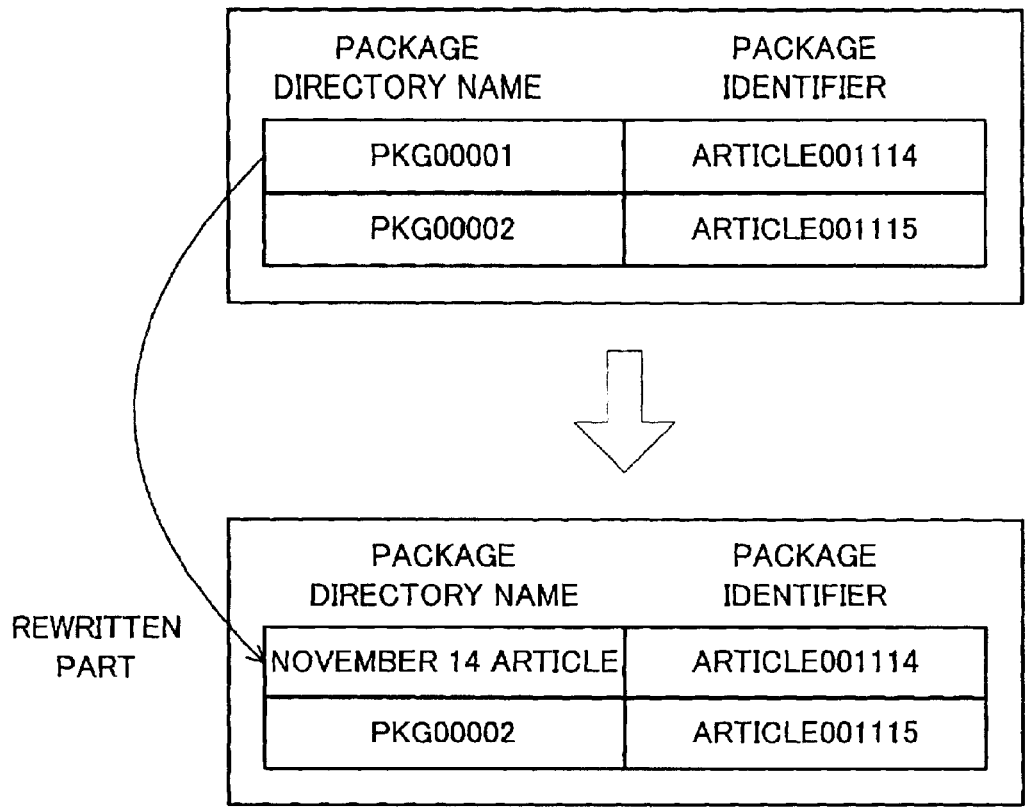
FIG. 16 is a drawing showing package management file rewriting in Embodiment 2 of the present invention.

Here, a case will be considered in which the directory name of package directory 302 is changed from "PKG00001" to "November 14 Article" by means of an operation of some kind, as shown in FIG. 15. In this case, along with the processing whereby the directory name is changed in the file system, the package management information recording section 131 rewrites the relevant package directory name part in the package management file as shown in FIG. 16. By this means, a link destination can be maintained even if a directory name change occurs after the directory name has been recorded on the recording medium 120.

Similarly, when a content file name on the recording medium 120, not a package directory, is changed, the content file recording section 132 can maintain the link destination by changing the relevant content file name part in the content file group management file.

As described above, with this embodiment, when a package directory name or content file name is changed by means of an operation of some kind, a link destination can be constantly maintained by changing the relevant package directory name part in the corresponding package management file, or the relevant content file name in the content file group management file.

(Embodiment 3)

In Embodiment 3, a method is described for performing distribution reservation when another package including the link destination file does not exist on the recording medium.

Figure 17:
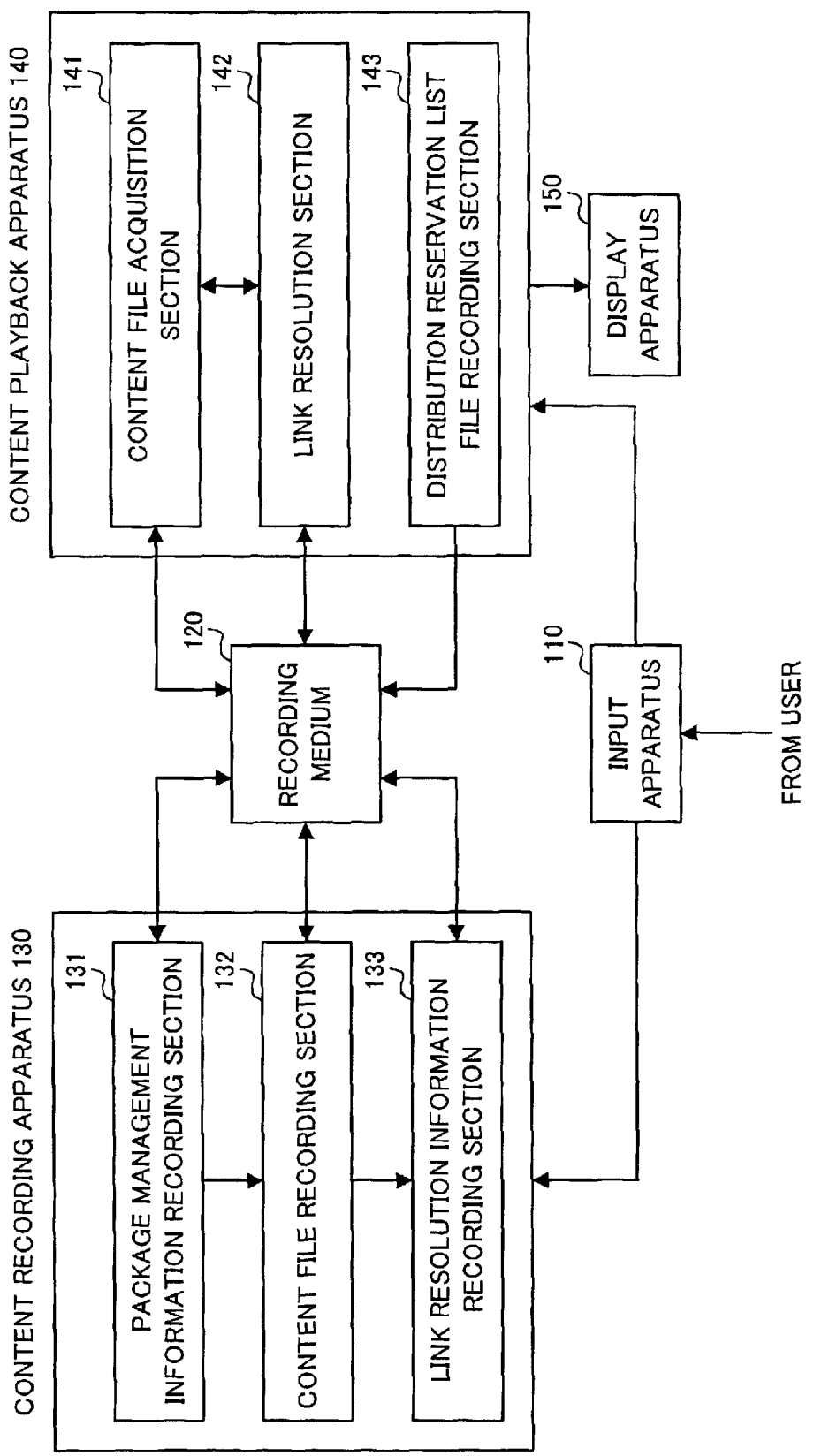
FIG. 17 is a block diagram showing the configuration of a content recording/playback apparatus in Embodiment 3 of the present invention.

FIG. 17 is a block diagram showing the configuration of a content recording/playback apparatus in Embodiment 3 of the present invention. Parts in the content recording/playback apparatus in FIG. 17 identical to those in FIG. 1 are assigned the same codes as in FIG. 1 and their detailed explanations are omitted. Compared with FIG. 1, the configuration of the content recording/playback apparatus in FIG. 17 features the addition of a distribution reservation list file recording section 143 for creating a distribution reservation list file to the content playback apparatus 140.

A distribution server that provides service to the content recording/playback apparatus in FIG. 17 assigns a package identifier to each package to be distributed, and manages the correspondence between distribution package data and package identifiers.

Figures 18, 19:
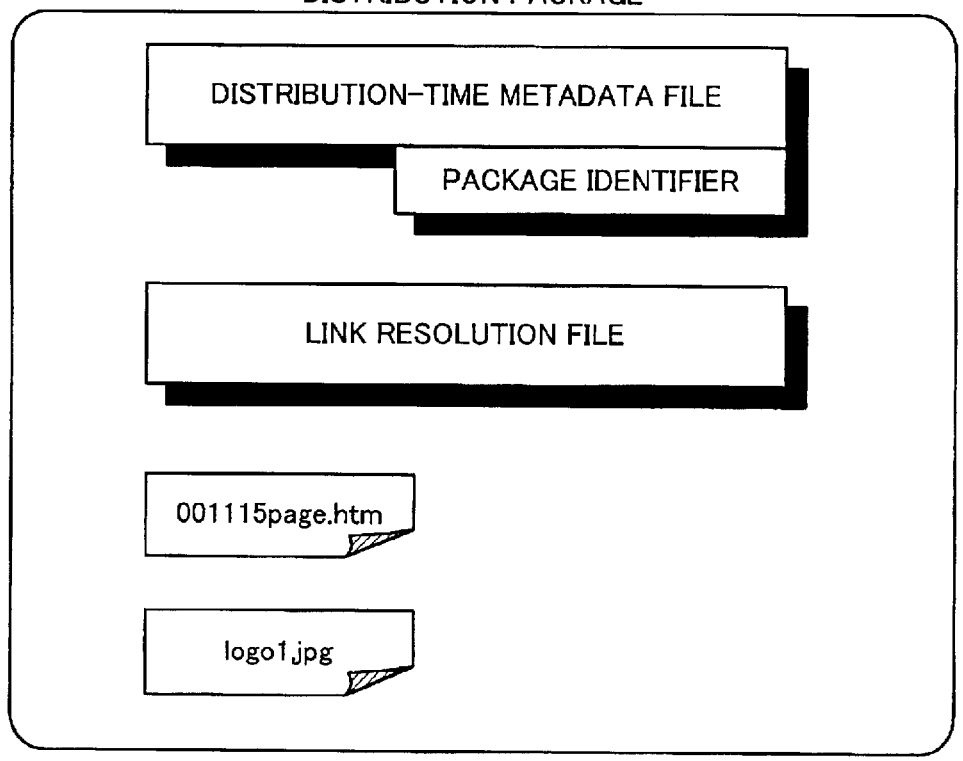
FIG. 18 is a drawing showing an example of a package identifier management table managed by a distribution server in Embodiment 3 of the present invention.
FIG. 19 is a drawing showing an example of distribution package data distributed from a distribution server in Embodiment 3 of the present invention.

FIG. 18 is a drawing showing an example of a package identifier management table held by a distribution server in order to manage the correspondence between distribution packages and package identifiers. This package identifier management table contains package identifiers and pointers to distribution package data to which the corresponding package identifiers are assigned.

If a package file contains a link to content included in another package, the distribution server references the package identifier management table and creates a link resolution file provided with the correspondence between the reference name indicating the link to that content and the package identifier of the package in which the link destination content exists, and distributes this included in the package data.

FIG. 19 is a drawing showing distribution package data distributed when the distribution server distributes package 610 shown in FIG. 6. The distribution package data includes a distribution-time metadata file in which metadata such as content related bibliographic matter, management information, and attribute information is recorded, a link resolution file, and content files with the file names "001115page1.htm" and "logo1.jpg". Package identifier information is recorded in the distribution-time metadata file. The link resolution file has the same contents as in FIG. 10.

When this distribution package data is input, the package management information recording section 131 of the content recording apparatus 130 creates a package management file using a package identifier assigned by the distribution server. Also, if a link resolution file is included in the distribution package data, the link resolution information recording section 133 stores this link resolution file on the recording medium 120. The operation of the content file recording section 132 is the same as in Embodiment 1.

Figures 20, 21:
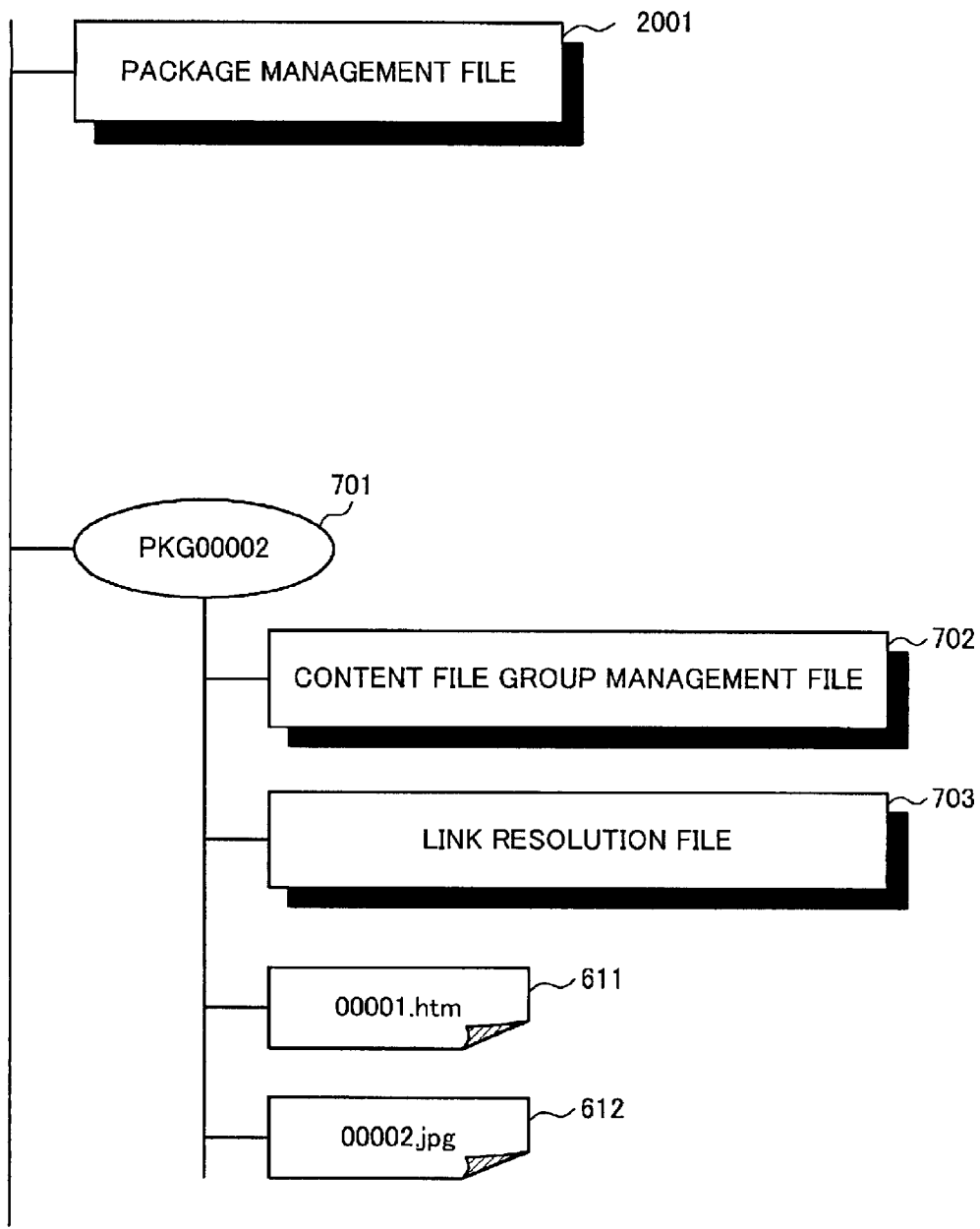
FIG. 20 is a drawing showing an example of directory and file configuration on a recording medium in Embodiment 3 of the present invention.
FIG. 21 is a drawing showing an example of a package management file in Embodiment 3 of the present invention.

The case will now be considered in which only the package shown in FIG. 6 has been recorded on the recording medium 120 by the content recording apparatus 130. FIG. 20 is a drawing showing the directory and file configuration on the recording medium 120 at this time. FIG. 20 differs from FIG. 7 in having no directory 302, content file group management file 303, HTML files 201 and 202, or image file 203, and in that the contents of package management file 2001 are different from those of package management file 301. Content file group management file 702 and link resolution file 703 under directory 701 are the same as in FIG. 9 and FIG. 10, respectively, in Embodiment 1.

FIG. 21 is a drawing showing an example of a package management file 2001. Package management file 2001 manages the correspondence between a package directory number corresponding to the package directory name and a package identifier for uniquely identifying that directory.

Link resolution processing will be described below for the case where the user follows a link to content included in another package from HTML file 611 currently being displayed.

Figure 22:
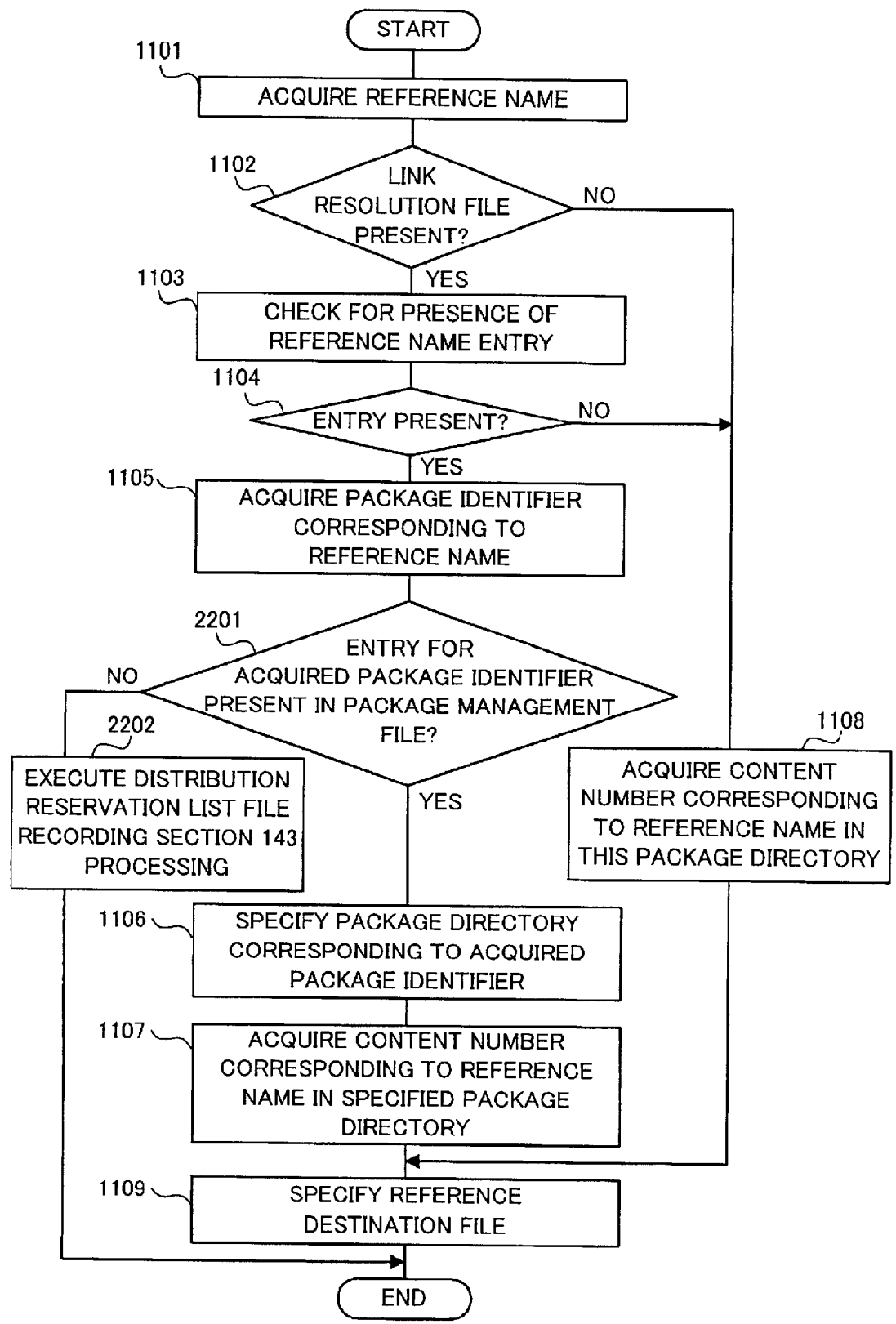
FIG. 22 is a drawing showing the processing flow of a link resolution section in Embodiment 3 of the present invention.

FIG. 22 is a drawing showing the processing flow in the link resolution section 142 in Embodiment 3. Steps in FIG. 22 identical to those in FIG. 11 are assigned the same codes as in FIG. 11. When the processing flow proceeds to Step 1106, Step 1107, Step 1108, or Step 1109 in FIG. 22, the processing is the same as in FIG. 11, and the relevant description is omitted.

Step 1101: First, reference name "001114page2.htm" acquired from HTML file 611.

Step 1102: A check is carried out as to whether or not a link resolution file exists in package directory 701 to which link source HTML file 611 belongs. In this case, as can be seen from FIG. 20, link resolution file 703 exists in package directory 701, so the processing flow proceeds to Step 1103. If there were no link resolution file 703, the processing flow would proceed to Step 1108.

Step 1103: Link resolution file 703 is looked at, and a check is carried out as to whether or not there is an entry for the reference name acquired in Step 1101. As can be seen from FIG. 10, a reference name "001114page2.htm" entry exists in link resolution file 703, so the processing flow proceeds to Step 1105 via Step 1104. If there were no entry in link resolution file 703, the processing flow would proceed to Step 1108 via Step 1104.

Step 1105: Package identifier "ARTICLE001114" corresponding to reference name "001114page2.htm" is acquired, and the processing flow proceeds to Step 2201.

Step 2201: A check is carried out as to whether or not there is an entry for the above-mentioned acquired package identifier "ARTICLE001114" in package management file 2001. In this case, as can be seen from FIG. 21, there is no entry, so the processing flow proceeds to Step 2202. If there were an acquired package identifier entry, the processing flow would proceed to Step 1106.

Step 2202: Distribution reservation list file recording section 143 processing is executed.

Figure 23:
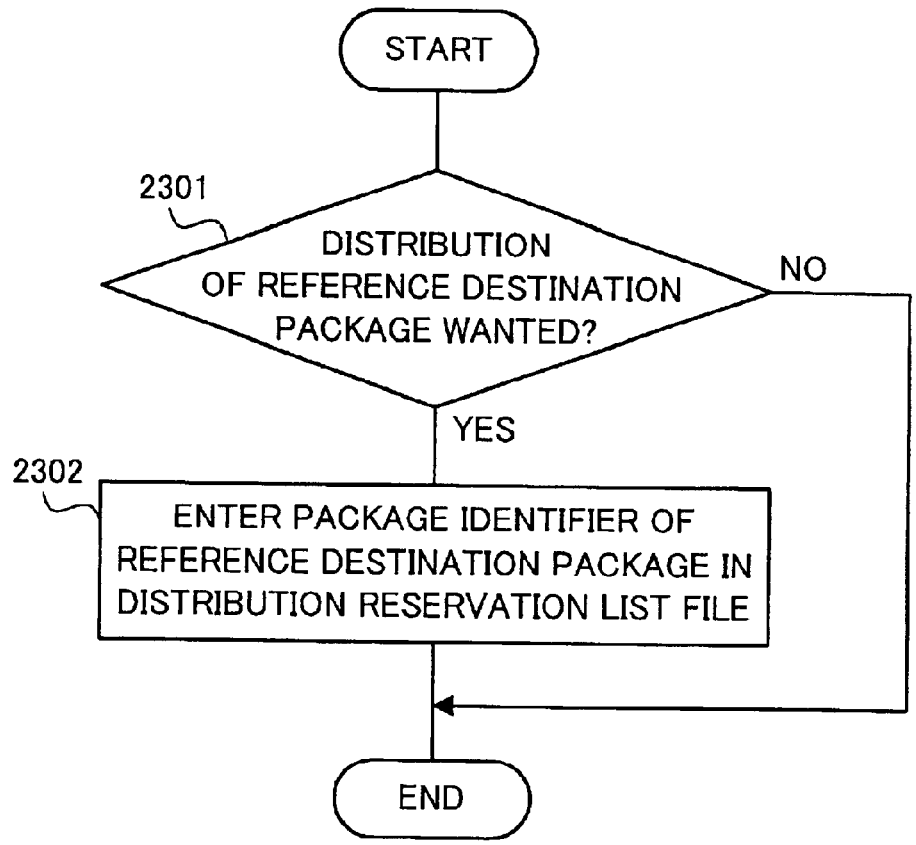
FIG. 23 is a drawing showing the processing flow of a distribution reservation list file recording section in Embodiment 3 of the present invention.

FIG. 23 is a drawing showing the processing flow of the distribution reservation list file recording section 143 in Embodiment 3.

Step 2301: First, a check is carried out as to whether or not the user wants the package that includes the reference destination file to be distributed when connection is established with the distribution server the next time distribution is performed. If distribution is not wanted, nothing is done and processing ends. If distribution is wanted, the processing flow proceeds to Step 2302.

Figure 24:
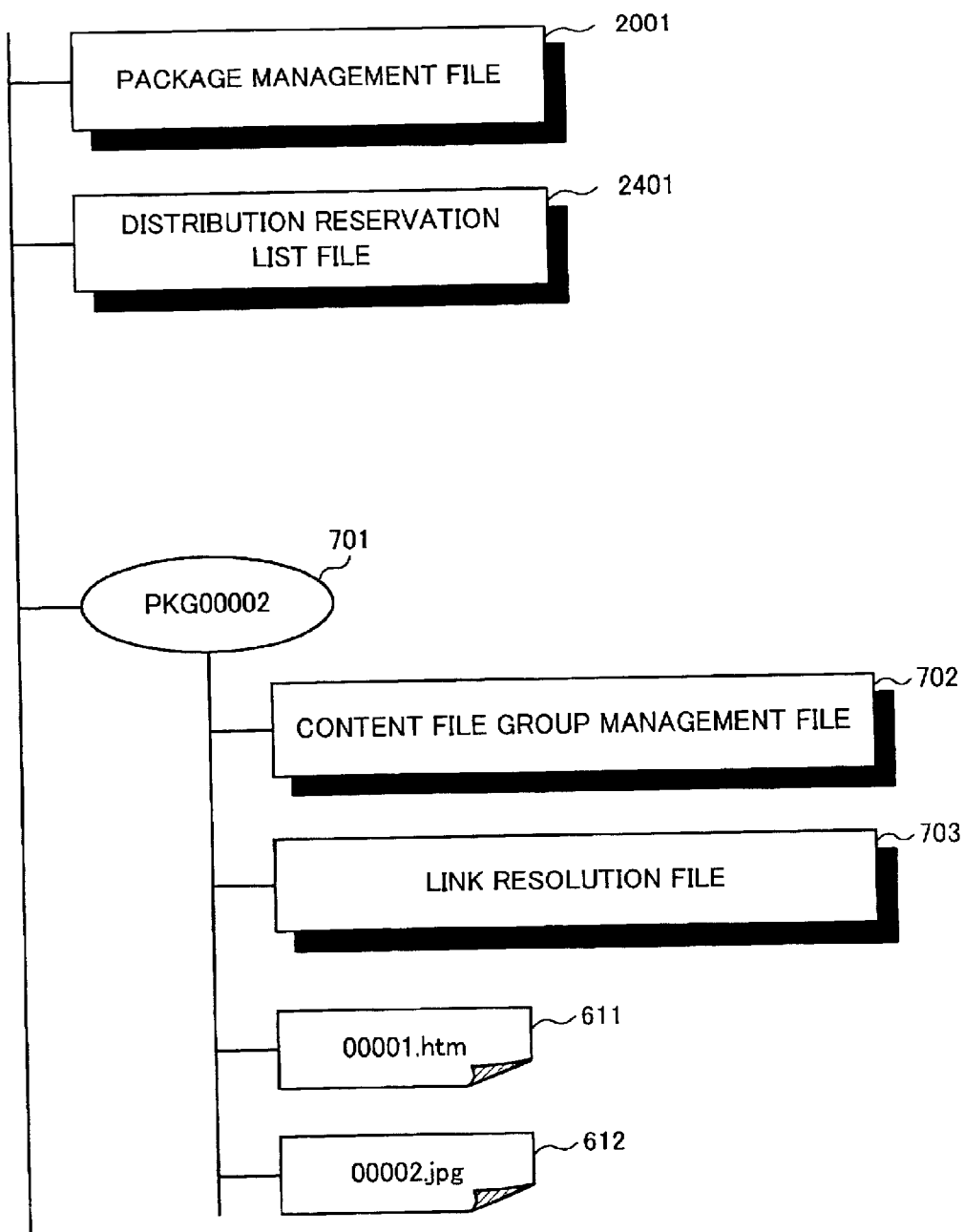
FIG. 24 is a drawing showing an example of directory and file configuration on a recording medium in Embodiment 3 of the present invention.
Figure 25:
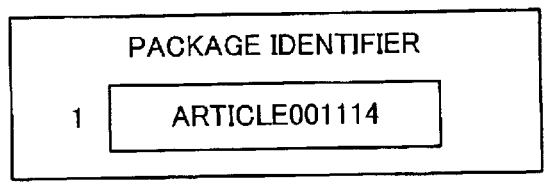
FIG. 25 is a drawing showing an example of a distribution reservation list file in Embodiment 3 of the present invention.

Step 2302: The above-mentioned acquired package identifier "ARTICLE001114" is entered in the distribution reservation list file. FIG. 24 is a drawing showing an example of directory and file configuration on the recording medium 120 at this time, and includes a distribution reservation list file 2401 in addition to the items in FIG. 20. FIG. 25 is a drawing showing an example of the distribution reservation list file 2401. In Step 2302, if a distribution reservation list file does not exist on the recording medium 120, one is newly created.

If a distribution reservation list file 2401 exists on the recording medium 120 in this way when connection is subsequently established between the content recording apparatus and distribution server for the purpose of distribution, the package identifier entered in the distribution reservation list file 2401 is transmitted to the distribution server. The distribution server finds the package corresponding to that package identifier from the package identifier management table, and performs download processing for that package.

When the package that has the same package identifier as the package identifier record in the distribution reservation list file 2401 is distributed from the distribution server, the distribution reservation list file recording section 143 deletes the distribution reservation list file as soon as the download of that package is completed.

As described above, in this embodiment a distribution reservation list file recording section 143 is provided, and by creating a distribution reservation list file in which is entered the package identifier of a package that does not exist on the recording medium 120, the necessary package can be downloaded automatically when connection is next established with the distribution server, without requiring the user to perform any particular operation.

In this embodiment, a method is described whereby the distribution reservation list file is stored beforehand on the recording medium 120, but a method may also be used whereby the distribution reservation list file is stored, not on the recording medium 120, but in a storage area in a content recording/playback apparatus equipped with a content recording apparatus 130 and content playback apparatus 140.

Also, in this embodiment, a description has been given in which the distribution reservation list file is deleted as soon as the download of a package entered in the distribution reservation list file is completed, but a method may also be adopted whereby the distribution reservation list file is not deleted, but the file contents are reset.

Furthermore, in the above-described embodiments, a case is described in which a link resolution file is created by a link resolution information recording section 133 of a content recording apparatus 130, but the present invention is not limited to this, and it is also possible for a link resolution file to be additionally created on the content distribution side, and distributed together with the content.

Moreover, it is also possible for playback and display of recorded content to be performed with the recording medium 120, on which content and file management information are recorded by the content recording apparatus 130, installed in another content playback apparatus.

In addition, it is also possible for the procedures in the file management method of the present invention to be recorded on a recording medium, and for this recording medium to be installed in a content recording/playback apparatus, and the procedures of the file management method of the present invention to be downloaded to the content recording/playback apparatus.

As is clear from the above descriptions, according to the present invention it is possible to specify a link destination even if the directory name or file name when content is recorded on a recording medium is different from a reference name written in other content linked to that content. Also, link destination content can be specified even if the link destination content belongs to a different package.

Moreover, a link destination can be constantly maintained even if the file name or directory name of a content file is rewritten by a user after that file has been recorded on a recording medium.

Furthermore, the content recording/playback apparatus of the present invention that implements this file management method can maintain a content link destination even if an original name is automatically assigned to distributed content or a user rewrites the file name or directory name, enabling content to be displayed edited as desired.

Still further, if a package that includes a reference destination file does not exist on the recording medium, the necessary package can be downloaded automatically when connection is next established with the distribution server, without requiring the user to perform any particular operation.

The present invention is not limited to the above described embodiments, and various variations and modifications may be possible without departing from the scope of the present invention.

This application is based on Japanese Patent Application No. 2000-354660 filed on Nov. 21, 2000, and Japanese Patent Application No. 2001-013720 filed on Jan. 22, 2001, entire content of which is expressly incorporated by reference herein.

What is claimed is:

1. A file management method for a recording medium having distributed content recorded thereon in packages of files, said method comprising:

creating a directory for each package;

recording a file of content included in a package under the directory created for the package;

designating a directory name of the directory in correspondence to a package directory number uniquely assigned to the package;

managing, using a package management file, a correspondence between the package directory number and a package identifier assigned to the package;

designating a file name of the file of content when the file is recorded on the recording medium in correspondence to a content number assigned on a per package basis; and managing, using a content file group management file, a correspondence between the content number and a reference name when the content is linked from other content.

2. The file management method according to claim 1, further comprising, when there exists, in the package, content linked to content included in another package, managing, using a link resolution file which is recorded on the recording medium, a correspondence between a reference name indicating the content included in the another package and a package identifier of the another package.

3. The file management method according to claim 1, wherein the content file group management file, the package management file, each package, and the directory for each package are recorded on the recording medium.

4. The file management method according to claim 1, wherein the reference name and the content number contained in the content file group management file are both used for determining a link destination of the other content.

5. A content playback method for playing back content from a recording medium on which:

distributed content is recorded in packages of files;

a directory is created for each package and a file of content included in a package is recorded under the directory created for the package;

a directory name of the directory is designated in correspondence to a package directory number uniquely assigned to the package;

a package management file is provided to manage a correspondence between the package directory number and a package identifier assigned to the package;

a file name of the file of content is designated in correspondence to a content number assigned on a per package basis; and a content file group management file is provided to manage a correspondence between the content number and a reference name when the content is linked from other content;

said content playback method comprising:

extracting a file of content from the recording medium; and when there is in the file of content a link specification to a file included in a same package as that in which the content is included, specifying a link destination file of content using the content file group management file.

6. The content playback method according to claim 5, wherein, when there is in the file of content a link specification to a file included in a different package from that in which the content is included, the recording medium contains a link resolution file which provides a correspondence between a reference name indicating the file included in the different package and a package identifier of the different package, and said content playback method further comprises specifying a link destination file of content using the package management file and the link resolution file.

7. The content playback method according to claim 5, wherein the reference name and the content number contained in the content file group management file are both used for determining a link destination of the other content.

8. A content recording apparatus for recording distributed content in packages of files on a recording medium, said content recording apparatus comprising:

a package management information recorder that creates a directory for each package, that designates a directory name of a directory in correspondence to a package directory number uniquely assigned to a package, and that creates and records, on the recording mediums, a package management file indicating a correspondence between the package directory number and a package identifier assigned to the package; and a content file recorder that designates a file name of the file of content when the file is recorded on the recording medium in correspondence to a content number assigned on a per package basis, that creates a content file group management file indicating a correspondence between the content number and a reference name when the content is linked from other content, and that records the file of content and the content file group management file on the recording medium.

9. The content recording apparatus according to claim 8, further comprising a link resolution information recorder that when there exists, in the package, content linked to content included in another package, creates and records on the recording medium a link resolution file indicating a correspondence between a reference name indicating the content included in the another package and a package identifier of the another package.

10. The content recording apparatus according to claim 8, wherein the reference name and the content number contained in the content file group management file are both used for determining a link destination of the other content.

11. A content playback apparatus for playing back content from a recording medium on which:

distributed content is recorded in packages of files;

a directory is created for each package and a file of content included in a package is recorded under the directory created for the package;

a directory name of the directory is designated in correspondence to a package directory number uniquely assigned to the package;

a package management file is provided to manage a correspondence between the package directory number and a package identifier assigned to the package;

a file name of the file of content is designated in correspondence to a content number assigned on a per package basis; and a content file group management file is provided to manage a correspondence between the content number and a reference name when the content is linked from other content;

said content playback apparatus comprising:

a content file acquirer operable to extract a file of content from the recording medium; and a link resolver operable to, when there is in the file of content a link specification to a file included in a same package as that in which the content is included, specify a link destination file of content using the file group management file.

12. The content playback apparatus according to claim 11, wherein, when there is in the file of content a link specification to a file included in a different package from that in which the content is included, the recording medium contains a link resolution file which provides a correspondence between a reference name indicating the file included in the different package and a package identifier of the different package, and said link resolver is operable to specify a link destination file of content using the package management file and the link resolution file.

13. The content playback apparatus according to claim 11, wherein the reference name and the content number contained in the content file group management file are both used for determining a link destination of the other content.

14. A computer executable program for recording distributed content in packages of files on a recording medium, said content computer executable program comprising:

computer executable code operable to cause a computer to create a directory for each package, designate a directory name of a directory in correspondence to a package directory number uniquely assigned to a package, and create and record on the recording medium a package management file indicating a correspondence between the package directory number and a package identifier assigned to the package; and computer executable code operable to cause a computer to designate a file name of the file of content when the file is recorded on the recording medium in correspondence to a content number assigned on a per package basis, create a content file group management file indicating a correspondence between the content number and a reference name when the content is linked from other content, and record the file of content and the content file group management file on the record medium.

15. The computer executable program according to claim 14, further comprising computer executable code operable to cause a computer to, when there exists, in the package, content linked to content included in another package, create and record on the recording medium a link resolution file indicating a correspondence between a reference name indicating the content included in the another package and a package identifier of the another package.

16. The computer executable program according to claim 14, wherein the reference name and the content number contained in the content file group management file are both used for determining a link destination of the other content.

17. A computer executable content playback program for playing back content from a recording medium on which:

distributed content is recorded in packages of files;

a directory is created for each package and a file of content included in a package is recorded under the directory created for the package;

a directory name of the directory is designated in correspondence to a package directory number uniquely assigned to the package;

a package management file is provided to manage a correspondence between the package directory number and a package identifier assigned to the package;

a file name of the file of content is designated in correspondence to a content number assigned on a per package basis; and a content file group management file is provided to manage a correspondence between the content number and a reference name when the content is linked from other content;

said computer executable content playback program comprising:

computer executable code operable to cause the computer to extract a file of content from the recording medium; and computer executable code operable to cause the computer to, when there is in the file of content a link specification to a file included in a same package as that in which the content is included, specify a link destination file of content using the content file group management file.

18. The computer executable content playback program according to claim 17, wherein, when there is in the file of content a link specification to a file included in a different package from that in which the content is included, the recording medium contains a link resolution file which provides a correspondence between a reference name indicating the file included in the different package and a package identifier of the different package, and said computer executable content playback program further comprises computer executable code operable to cause the computer to specify a link destination file of content using the package management file and the link resolution file.

19. The computer executable content playback program according to claim 17, wherein the reference name and the content number contained in the content file group management file are both used for determining a link destination of the other content.

20. A content playback method for playing back content from a recording medium on which distributed content is recorded in packages of files, each package having at least one file of content and a directory under which the at least one file of content is recorded, the directory having a directory name corresponding to a package directory number uniquely assigned to the package, a package management file manages a correspondence between the package directory number and a package identifier assigned to the package, the content playback method comprising:

extracting a file of content from the recording medium, the file of content having a file name corresponding to a content number assigned on a per package basis; and when the file of content includes a link specification to a file included in a same package as that in which the file of content is included, specifying a link destination file of content using a content file group management file, which manages a correspondence between the content number and a reference name when the content is linked from other content.

21. A content playback apparatus for playing back content from a recording medium on which distributed content is recorded in packages of files, each package having at least one file of content and a directory under which the at least one file of content is recorded, the directory having a directory name corresponding to a package directory number uniquely assigned to the package, a package management file manages a correspondence between the package directory number and a package identifier assigned to the package, the content playback apparatus comprising:

a content file acquirer that extracts a file of content from the recording medium, the file of content having a file name corresponding to a content number assigned on a per package basis; and a link resolver that, when the file of content includes a link specification to a file included in a same package as the package in which the content is included, specifies a link destination file of content using a content file group management file, which manages a correspondence between the content number and a reference name when the content is linked from other content.

22. A computer executable content playback program for playing back content from a recording medium on which distributed content is recorded in packages of files, each package having at least one file of content and a directory under which the at least one file of content is recorded, the directory having a directory name corresponding to a package directory number uniquely assigned to the package, a package management file manages a correspondence between the package directory number and a package identifier assigned to the package, the computer executable content playback program comprising:

a content file acquiring code segment that causes a computer to extract a file of content from the recording medium, the file of content having a file name corresponding to a content number assigned on a per package basis; and a link resolving code segment that, when the file of content includes a link specification to a file included in a same package as the package in which the content is included, causes the computer to specify a link destination file of content using a content file group management file, which manages a correspondence between the content number and a reference name when the content is linked from other content.

* * * * *

UNITED STATES PATENT AND TRADEMARK OFFICE
CERTIFICATE OF CORRECTION

PATENT NO. : 6,922,707 B2
DATED : July 26, 2005
INVENTOR(S) : T. Shimojima et al.

It is certified that error appears in the above-identified patent and that said Letters Patent is hereby corrected as shown below:

Column 13,
Line 37, "mediums" should be -- medium --.
Line 51, after "that" insert -- , --.

Signed and Sealed this

Twenty-seventh Day of December, 2005

JON W. DUDAS
*Director of the United States Patent and Trademark Office*